United States Patent [19]
Chen et al.

[11] Patent Number: 5,781,897
[45] Date of Patent: Jul. 14, 1998

[54] METHOD AND SYSTEM FOR PERFORMING RECORD SEARCHES IN A DATABASE WITHIN A COMPUTER PERIPHERAL STORAGE DEVICE

[75] Inventors: Wen-Tzer Thomas Chen; Renato John Recio, both of Austin, Tex.

[73] Assignee: International Business Machines Corporation, Armonk, N.Y.

[21] Appl. No.: 634,511

[22] Filed: Apr. 18, 1996

[51] Int. Cl.⁶ .................................................. G06F 17/30
[52] U.S. Cl. ............................. 707/3; 707/4; 707/5
[58] Field of Search .............. 395/200.14, 497.01, 395/884, 309, 491, 827, 672, 825; 364/131, 239; 382/237; 707/3, 4, 5

[56] References Cited

U.S. PATENT DOCUMENTS

| | | | |
|---|---|---|---|
| 4,148,098 | 4/1979 | McCreight et al. | 395/491 |
| 4,292,669 | 9/1981 | Wollum et al. | 395/884 |
| 4,445,176 | 4/1984 | Burk et al. | 395/200.14 |
| 4,783,730 | 11/1988 | Fischer | 395/625 |
| 5,113,500 | 5/1992 | Talbott et al. | 395/309 |
| 5,179,702 | 1/1993 | Spix et al. | 395/672 |
| 5,416,857 | 5/1995 | Chen et al. | 382/237 |
| 5,418,965 | 5/1995 | Mahar | 395/497.01 |
| 5,423,018 | 6/1995 | Dang et al. | 711/159 |
| 5,548,735 | 8/1996 | Chen et al. | 395/827 |
| 5,627,745 | 5/1997 | Flood | 364/131 |

*Primary Examiner*—Thomas G. Black
*Assistant Examiner*—Charles L. Rones
*Attorney, Agent, or Firm*—Antony P. Ng; Andrew J. Dillon

[57] ABSTRACT

A method for record searching in a database within a computer system are disclosed. The computer system includes a main processor, a main memory, and a peripheral storage device having a secondary processor. In accordance with the method of the present invention, a command block specifying a search string for record searching in at least one database table of the database is prepared. Subsequently, the command block is issued from the main processor to the secondary processor within the peripheral storage device of the computer system. The secondary processor within the peripheral storage device is then utilized to read the database table(s) into a memory within the peripheral storage device, in response to a receipt of the command block. The search string in the command block is compared to each record of the database table(s) within the memory of the peripheral storage device to identify all the records therein which contain the search string. Finally, all identified records which contain the search string are moved from the memory of the peripheral storage device to the main memory within the computer system, such that database record searching may be performed in a more efficient manner.

11 Claims, 5 Drawing Sheets

METHOD AND SYSTEM FOR PERFORMING RECORD SEARCHES IN A DATABASE WITHIN A COMPUTER PERIPHERAL STORAGE DEVICE

BACKGROUND OF THE INVENTION

1. Technical Field

The present invention relates in general to a method and system for data processing and, in particular, to a method and system for executing searches within a computer system. Still more particularly, the present invention relates to a method and system for efficiently performing record searches in a database within a computer system.

2. Description of the Prior Art

Databases play a vital role in almost all areas where computers are utilized, including business, engineering, and research and development. A database is a logically coherent collection of data with some inherent meaning, and a database management system (DBMS) is a collection of software that facilitates the processes of defining, constructing, and manipulating databases for various applications. Defining a database involves specifying the types of data to be stored in the database, along with a detailed description of each type of data. Constructing a database is the process of storing the data itself on a storage medium that is controlled by the DBMS. Manipulating a database includes such functions as querying to retrieve specific data and updating to reflect changes.

The collection of data that makes up a computerized database must be physically stored on a computer storage medium. The DBMS software can then retrieve, update, and process this data as needed. Computer storage media form a storage hierarchy that includes two main categories—primary storage and secondary storage. Primary storage includes storage media that can be operated on directly by a central processing unit (CPU), such as a system main memory and/or a smaller but faster cache memory. Primary storage usually provides faster access to data but is of limited storage capacity. Secondary storage includes magnetic disks, tapes, and drums that are usually of larger capacity, but provide slower access to data than the primary storage.

In performing database transactions, one of the most common operations is to search for a string of characters through one or several database tables within a database. For example, one could make a query for all records in a database table where a selected field includes a primary key of "Snoopy." When searching for the matching records, each and every record in the database table must be read and compared to the character string "Snoopy." If there is a match, the record will be selected. On the other hand, the record will be discarded if there is no match. Typically, data in secondary storage cannot be processed directly by the CPU; thus each record must be copied into primary storage in the system in which the comparison is performed. However, by reading a record from a disk into system main memory through several layers of I/O bus and system bus before the comparison of character string(s) can be performed, precious system resources (i.e., I/O bus, system bus, memory, and CPU time) will be wasted if the record being processed is to be discarded eventually. Unfortunately, the number of records that are discarded is often greater than the number of records that are selected in this kind of database transaction. Consequently, it would be desirable to provide a method to perform record searches more efficiently in a database within a computer system.

SUMMARY OF THE INVENTION

In view of the foregoing, it is therefore an object of the present invention to provide an improved method and system for data processing.

It is another object of the present invention to provide an improved method and system for executing searches within a computer system.

It is yet another object of the present invention to provide an improved method and system for efficiently performing record searches in a database within a computer system.

A method and system for record searching in a database within a computer system are disclosed. The computer system includes a main processor, a main memory, and a peripheral storage device having a secondary processor. In accordance with the method of the present invention, a command block specifying a search string for record searching in at least one database table of the database is prepared. Subsequently, the command block is issued from the main processor to the secondary processor within the peripheral storage device of the computer system. The secondary processor within the peripheral storage device is then utilized to read the database table(s) into a memory within the peripheral storage device, in response to a receipt of the command block. The search string in the command block is compared to each record of the database table(s) within the memory of the peripheral storage device to identify all the records therein which contain the search string. Finally, all identified records which contain the search string are moved from the memory of the peripheral storage device to the main memory within the computer system, such that database record searching may be performed in a more efficient manner.

All objects, features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF PREFERRED EMBODIMENT

The present invention may be executed in a variety of computers under a number of different operating systems.

The computer may be, for example, a personal computer, a mini-computer, or a mainframe computer. In addition, the computer may be a stand-alone system or part of a network such as a local-area network (LAN) or a wide-area network (WAN). For the purpose of illustration, a preferred embodiment of the present invention, as described below, is implemented on a mini-computer, such as the AS/400™ series manufactured by International Business Machines Corporation.

Figure 1:
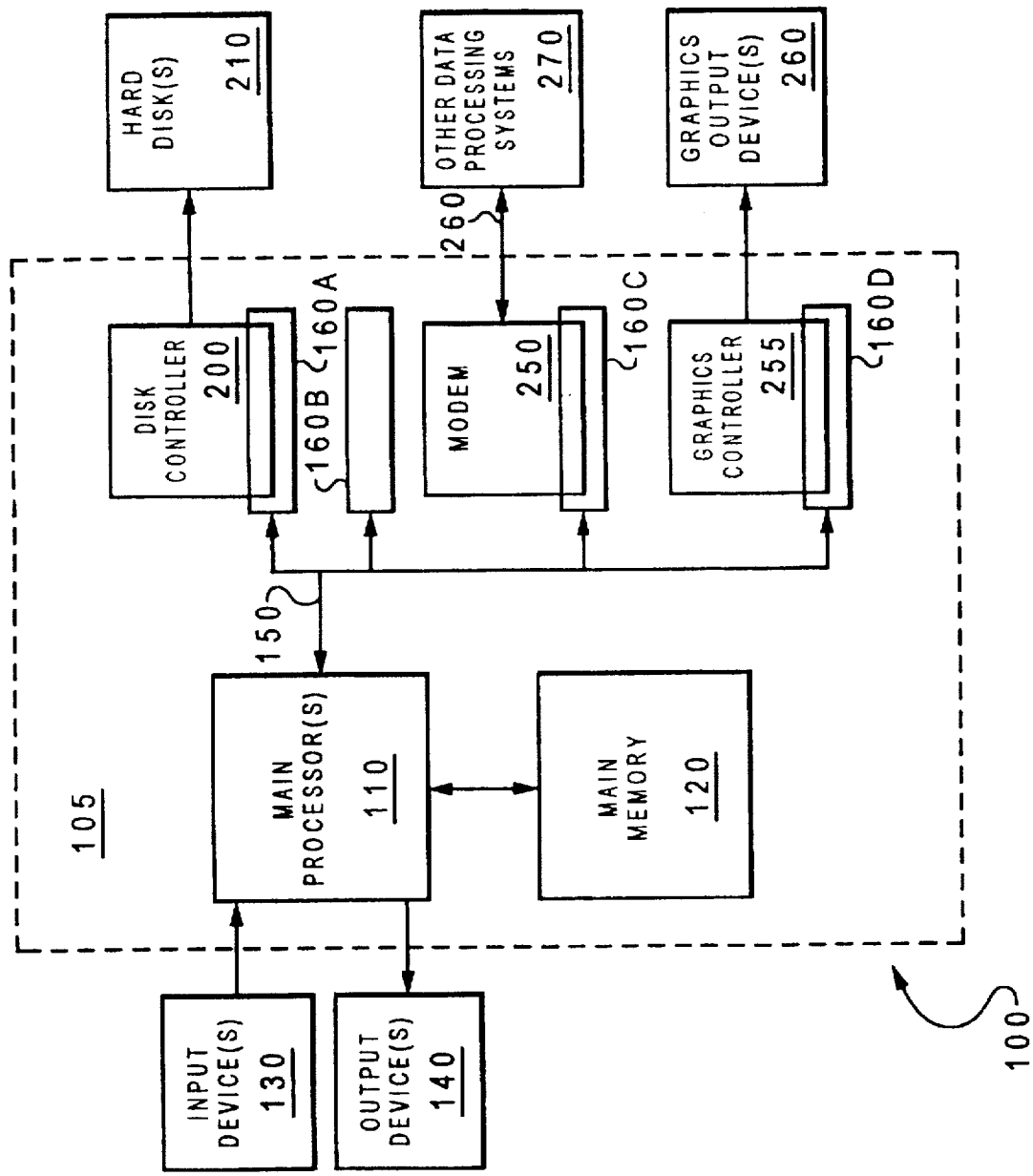
FIG. 1 is a block diagram of a computer which utilizes a preferred embodiment of the invention.

Referring now to the drawings and in particular to FIG. 1, there is illustrated a block diagram of computer 100 which may utilize a preferred embodiment of the present invention. Computer 100 typically includes main processor(s) 110 coupled to a main memory 120 within processor unit 105, having input device(s) 130 and output device(s) 140 attached thereto. Main processor(s) 110 may include a single processor or multiple processors. Input device(s) 130 may include a keyboard, a keypad, or other types of input device. Output device(s) 140 may include a monitor, a printer, or other types of output device. A number of peripheral devices may be connected to adaptors 160A, 160B, 160C and 160D in order to provide communications with main processor 110 via internal bus 150. As shown in FIG. 1, disk controller 200, modem 250, and graphics controller 255 are connected to adaptors 160A, 160C and 160D, respectively, while adaptor 160B remains open. Graphics controller 255 receives instructions regarding graphics from main processor 110 via internal bus 150, thereby rendering the desired graphics output from main processor 110 to graphics output device(s) 260. Modem 250 may communicate with other data processing systems 270 across communications line 260. Disk controller 200 receives instructions from main processor 110 regarding writing and reading information to and from hard disk(s) 210. Hard disk(s) 210 may include a single hard disk or multiple hard disks. Typically, information from hard disk(s) 210 is transferred to main memory 120 to be utilized by main processor(s) 110. However, a different type of memory known as a cache memory (not shown) may also be present, normally between main processor(s) 110 and main memory 120, for enhancing the speed of the memory access by main processor(s) 110.

As a preferred embodiment of the invention, adaptor 160A, disk controller 200, and hard disk(s) 210 are communicating via an industry standard known as SCSI (small computer system interface). The SCSI standard is typically utilized for connecting computers to peripheral devices, other computers, and/or local area networks. Up to seven devices, not including the computer, can be attached via a single SCSI port through sequential connections called a daisy chain. In addition, any one of adaptor 160A, disk controller 200, and hard disk(s) 210 preferably contains a processor therein. Typically, such processor has an on-chip system memory and may be of a slower speed than that of main processor(s) 110.

Figure 2:
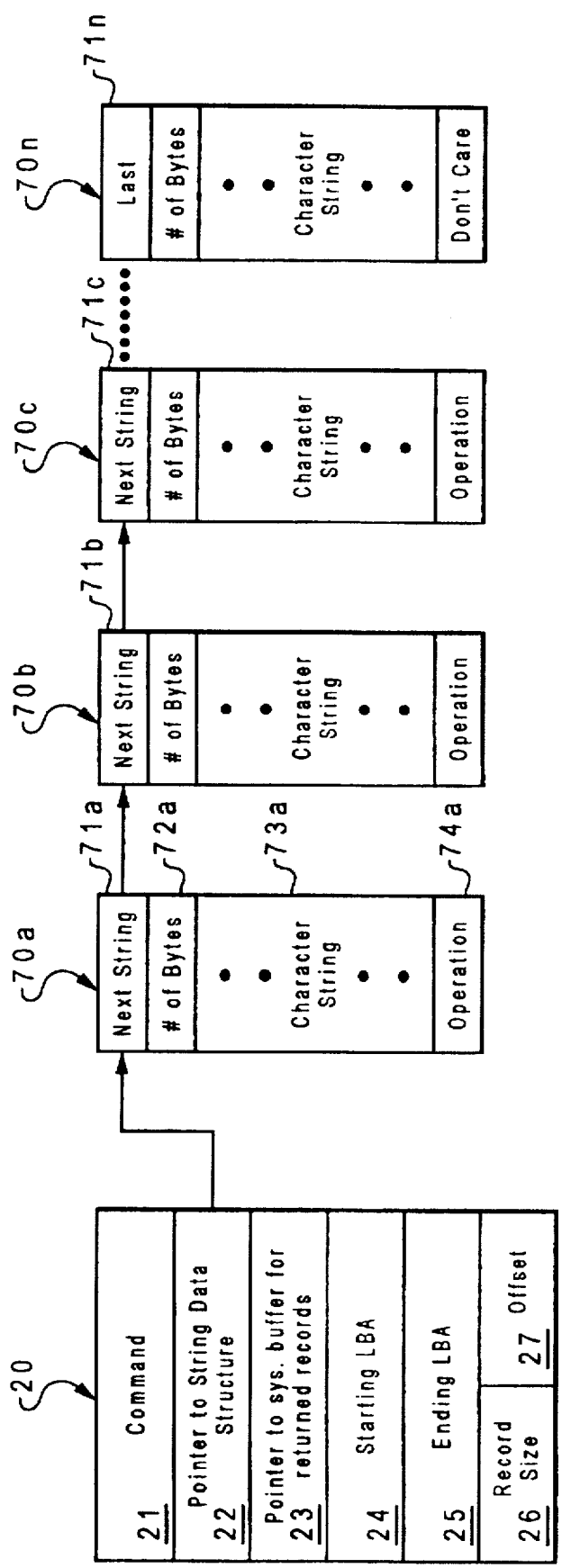
FIG. 2 is a block diagram of a command structure along with data structures of several search strings, under the SCSI standard in accordance with a preferred embodiment of the invention.

With reference now to FIG. 2, there is illustrated a block diagram of a command structure along with data structures of several search strings, under the SCSI standard in accordance with a preferred embodiment of the invention. Command structure 20 leads with a command field 21. For the purpose of this illustration, command field 21 contains a "search" command in hexadecimal format; however, it is understood by those skilled in the art that command field 21 may contain a command of any type or format that is acceptable under the SCSI standard. Command field 21 is followed by two pointer fields-a pointer field 22 and a pointer field 23. Pointer field 22 contains an address location of main memory 120 in which a data structure is stored.

From a logical standpoint, pointer field 22 can be viewed as pointing to the data structure stored in main memory 120. As shown in FIG. 2, pointer field 22 points to a data structure 70a. Data structure 70a preferably includes a next string field 71a, a number of bytes field 72a, a character string field 73a, and an operation field 74a. Next string field 71a contains an address location of main memory 120 in which a second data structure is stored. More than one data structure is required when multiple search strings have been specified in the search command. As shown, next string field 71a of data structure 70a points to next string field 71b of data structure 70b, and next string field 71b of data structure 70b points to next string field 71c of data structure 70c, until finally a last string field 71n of data structure 70n is reached. Data structure 70n is the last data structure for this concatenated data structure.

To complete the description of data structure 70a, number of bytes field 72a contains the number of bytes of the search string, character string field 73a contains the search string itself, and operation field 74a contains a logical operation such as AND, OR, NOT, etc., to be operated with one or more data structures. It is understood that all data structures from 70a through 70n have similar formats.

To continue with the description of command structure 20, pointer field 23 contains an address location of main memory 120 in which a system buffer is reserved for returned records. Typically, the size of the reserved system buffer is about several four-Kbyte pages. Following pointer fields 22 and 23 are two logical block address (LBA) fields-a starting LBA field 24 and an ending LBA field 25. Starting LBA field 24 contains a logical address for the starting location of the database table in hard disk(s) 210 and ending LBA field 25 contains a logical address for the ending location of the database table in hard disk(s) 210. Record size field 26 comes after LBA fields 24, 25. Record size field 26 contains the size of each record within the database table. Finally, offset field 27 contains the exact byte location of the search field within a record in order to facilitate the searching process. Although the searching process can be accelerated with the presence of offset field 27, the functionality of command structure 20 will not be hampered should offset field 27 be discarded. As a preferred embodiment of the present invention, each field within command structure 20 is 32-bit long, with the exception of record size field 26 and offset field 27, which are 16-bit long each.

Figure 3:
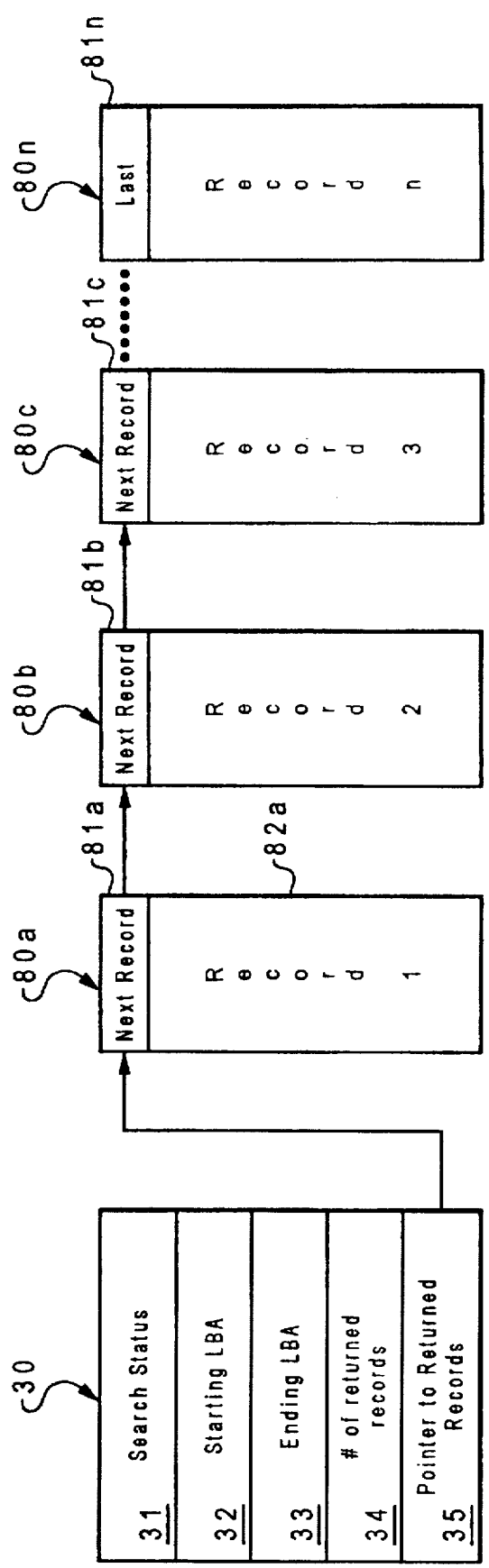
FIG. 3 is a block diagram of a search status structure along with data structures of several returned records, under the SCSI standard in accordance with a preferred embodiment of the invention.

Referring now to FIG. 3, there is illustrated a block diagram of a search status structure along with data structures of several returned records, under the SCSI format in accordance with a preferred embodiment of the invention. Status structure 30 leads with a search status field 31. Search status field 31 contains a returned search status, such as record found, record not found, etc. Search status field 31 is followed by two LBA fields—a starting LBA field 32 and an ending LBA field 33. Similar to LBA fields 24, 25 of command structure 20, starting LBA 32 contains a logical address for the starting location of the database in hard disk(s) 210 and ending LBA field 33 contains a logical address for the ending location of the database in hard disk(s) 210. Following LBA fields 32 and 33 is a number of returned records field 34 which contains, as the name implies, the total number of records found in the database that satisfies the search string. Finally, a pointer field 35 contains an address which points to the location of the returned records in the system buffer. As shown, pointer field 35 points to a next record field 81a of a first record 80a. Record field 82a contains the actual contents of the first returned record. Because there is more than one record found, next record field 81a points to a next record field 81b of a second record 80b. This concatenation continues until a last record 80n is reached.

Figure 4:
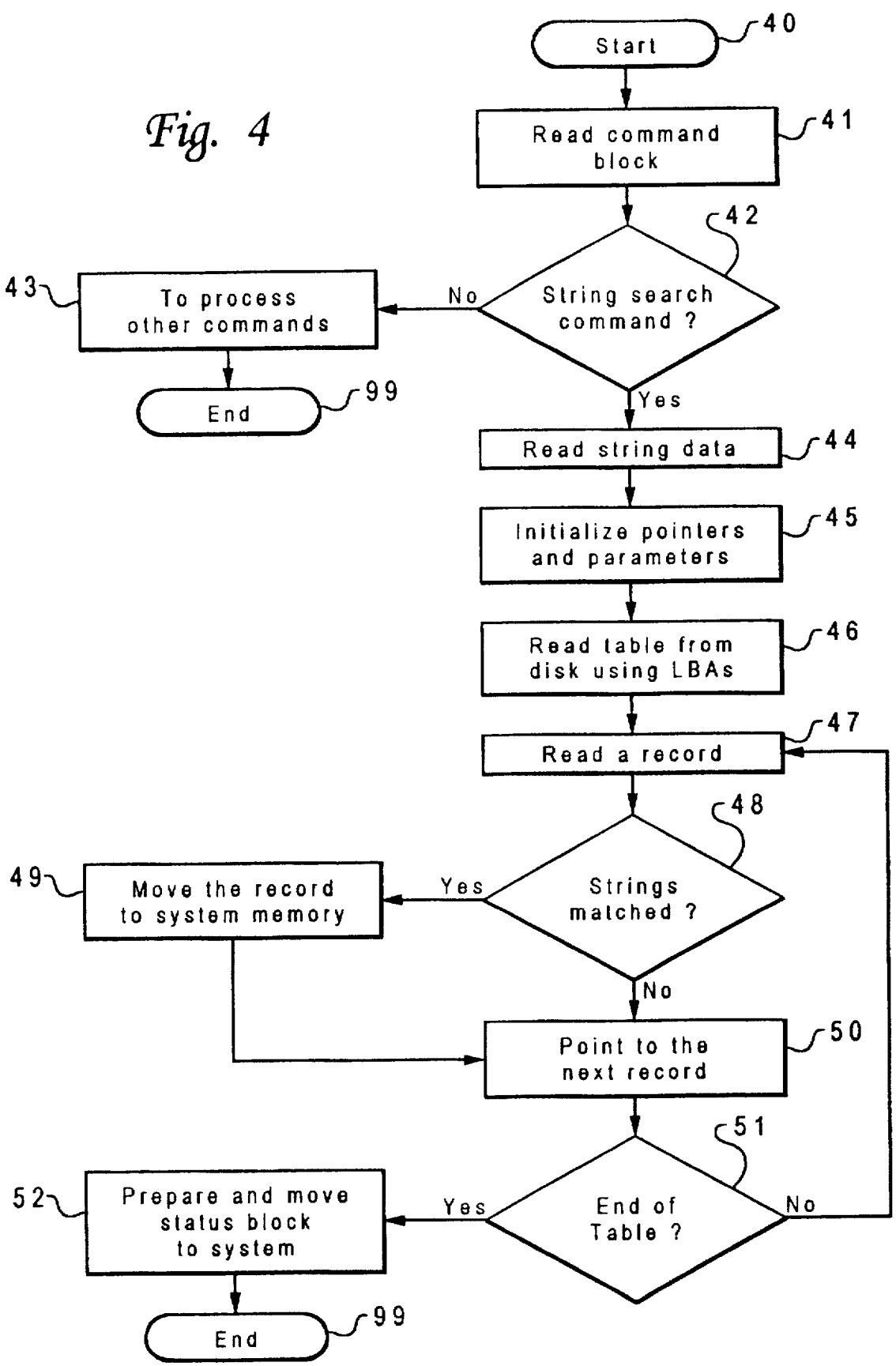
FIG. 4 is a high-level flow diagram of a method for record searching in a database within a computer system, according to a preferred embodiment of the invention.

Referring now to FIG. 4, there is illustrated a high-level flow diagram of the method for recording searching in a database within a computer system, according to a preferred embodiment of the invention. For the purpose of illustration, this invention is implemented in adaptor 160a of FIG. 1, though the invention can also be implemented in either disk controller 200 or hard disk(s) 210, depending on where the intelligence is located. The intelligence is reflected by the presence of a secondary processor. Starting at block 40, a command block prepared and issued by the main processor is first read by adaptor 160a as depicted at block 41. A determination is then made, as illustrated at block 42, as to whether the command block is a search command or not. If the command block is not a search command having a structure as shown is FIG. 2, adaptor 160a will process the command block accordingly, as depicted at block 43, and the process then exits, as depicted at block 99. Otherwise, if the command block is a search command having a structure as shown is FIG. 2, adaptor 160a reads the information contained in the search command, as depicted at block 44. Then, adaptor 160a initializes all the pointers and parameters that are required for the searching process to begin, as shown at block 45.

As illustrated at block 46, adaptor 160a reads the database table from hard disk(s) 210 to the on-chip memory within a secondary processor on adaptor 160a by utilizing the starting LBA and the ending LBA in the command block. Adaptor 160a proceeds to a each record in the database table, as depicted at block 47. A determination is then made, as illustrated at block 48, as to whether there is a match within the record to the search string in the command block. If there is a match within the record, the record is moved to the system buffer in the main memory, as shown at block 49, and the process proceeds to block 50 to prepare for reading a next record. Otherwise, if no there is no match within the record, the process immediately proceeds to block 50 to prepare for reading a next record. As depicted at block 51, a determination is made as to whether the end of the database table is reached. If the end of the database table is not reached, the process returns back to block 47 to read a new record. Otherwise, if the end of the database table is reached, adaptor 160a prepares and move a status block having a structure as shown in FIG. 3 to main processor(s) 110. Finally, the process exits, at depicted at block 99.

Figure 5:
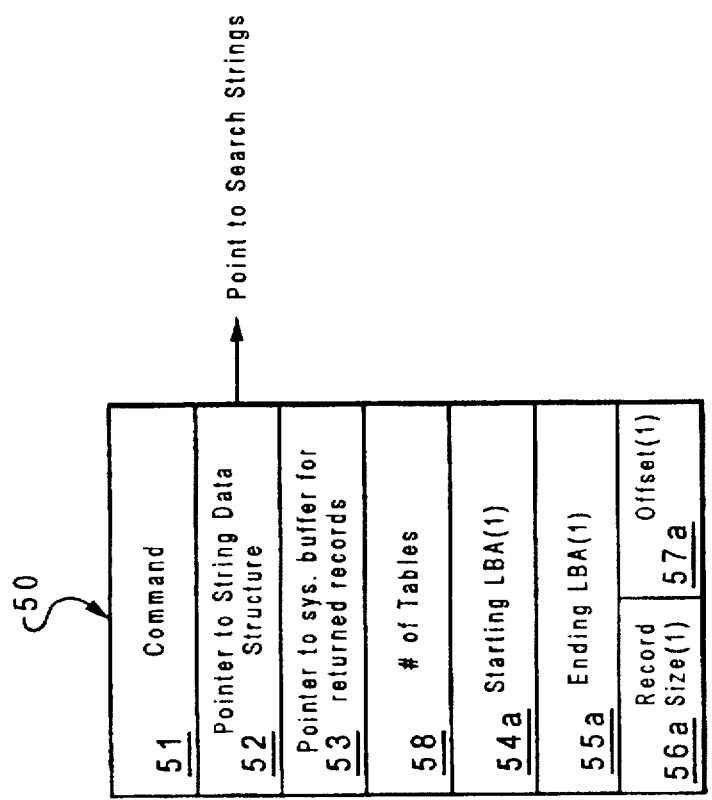
FIG. 5 is an alternative embodiment of the command structure for searching several database tables simultaneously.
Figure 5:
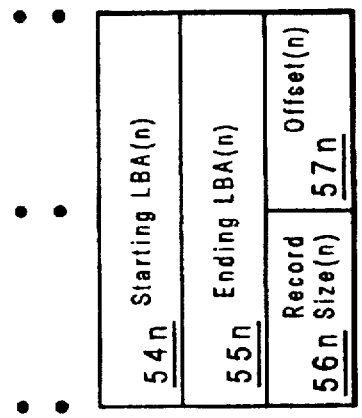

Referring now to FIG. 5, there is illustrated an alternative embodiment of the command structure for searching several database tables simultaneously. Command structure 50 is very similar to command structure 20 of FIG. 2. Command structure 50 starts with command field 51. Command field 51 is followed by two pointer fields—a pointer field 52 and a pointer field 53. Following pointer fields 52 and 53 is a number of tables field 58 which, as the name implies, contains the total number of database tables involved in the simultaneous search. Then follows a series of fields that points to the location of the database tables in hard disk(s) 210. Each series includes two logical block address (LBA) fields—a starting LBA field and an ending LBA field, a record size field, and an offset field. The length of the series depends on the number of database tables intended to be searched simultaneously. As shown in FIG. 5, the series starts from 54a, 55a, 56a, and 57a to 54n, 55n, 56n, and 57n. Other than number of tables field 58, the functions of all other fields in command structure 50 are identical to those in command structure 20 of FIG. 2.

Figure 6:
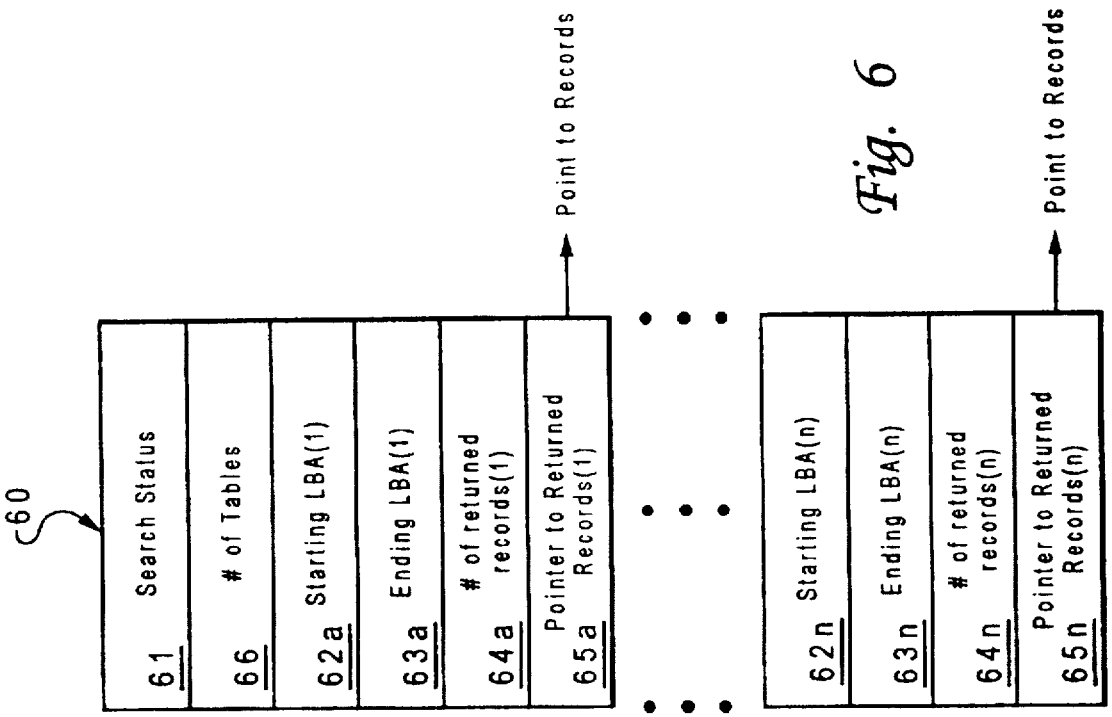
FIG. 6 is an alternative embodiment of the search status structure returning from a simultaneous search of several database tables.

With reference now to FIG. 6, there is illustrated an alternative embodiment of the search status structure returning from a simultaneous search of several database table. Search status structure 60 is very similar to search status structure 30 of FIG. 3. Search status structure 60 starts with a search status field 61. Following search status field 61 is a number of tables field 66 which again contains the total number of database tables involved in the simultaneously search. Number of tables field 66 is followed by a series of fields. Each series includes two LBA fields—a starting LBA field and an ending LBA field, a number of returned records field, and a pointer field. Similar to command structure 50 of FIG. 5, the length of the series depends on the number of database tables intended to be searched simultaneously. As shown in FIG. 6, the series starts from 62a, 63a, 64a, and 65a to 62n, 63n, 64n, and 65n. Again, other than number of tables field 66, the functions of all other fields in search status structure 60 are identical to those in search status structure 30 of FIG. 3.

As has been described, the present invention provides an improved method for record searching in a database within a computer system. For the purpose of illustration, the invention is implemented in a SCSI adaptor, though the invention can also be implemented in a SCSI disk controller or in a SCSI hard disk. This is possible because most of today's high-end peripheral storage devices such as SCSI adaptors, SCSI disk controllers, and even SCSI hard disks are equipped with a resident secondary processor having sufficient on-chip memory and/or on-board memory. The resident secondary processor is responsible for executing the search command and interfacing with the main processor. In addition, the resident secondary processor is also responsible for comparing searched fields to the character strings and to set up direct memory access (DMA) for transferring records which match the search string to the main memory. The local on-chip or on-board memory of the SCSI adaptor is utilized for temporary storage when records are read from the hard disks.

By off-loading the search command to a SCSI adaptor, a SCSI disk controller or a SCSI hard disk, the computer system can entirely eliminate the unnecessary processing of the records that do not match the search criteria. In turn, the system resources, such as I/O bus, memory bus, CPU time, etc., can then be better utilized for processing other useful tasks. As a result, the overall throughput of the computer system can be improved. Furthermore, although the SCSI standard is utilized throughout this disclosure for illustrating the present invention, any other compatible industry standard may also be applicable.

While the invention has been particularly shown and described with reference to a preferred embodiment, it will be understood by those skilled in the art that various changes in form and detail may be made therein without departing from the spirit and scope of the invention.

What is claimed is:

1. A method for record searching in a database within a computer system, wherein said computer system includes a main processor, a main memory, and a peripheral storage device having a secondary processor, said method comprising the step of:

preparing a command block specifying a search string for record searching in at least one database table of said database;

issuing said command block from said main processor to said secondary processor within said peripheral storage device of said computer system;

utilizing said secondary processor within said peripheral storage device to read said at least one database table into a memory within said peripheral storage device, in response to a receipt of said command block;

comparing said search string in said command block to each record of said at least one database table within said memory of said peripheral storage device to identify all records which contain said search string; and moving all identified records which contain said search string from said memory of said peripheral storage device to said main memory within said computer system, wherein said database record searching is performed in a more efficient manner.

2. The method for record searching in a database within a computer system according to claim 1, said method further includes the step of returning of a search status block from said secondary processor to said main processor.

3. The method for record searching in a database within a computer system according to claim 2, wherein said step of returning a search status block further includes the step of returning a search status block having at least one search status field, at least three address pointer fields and at least one number of returned records field.

4. The method for record searching in a database within a computer system according to claim 1, wherein said step of preparing a command block further includes the step of preparing a command block having at least four address pointer fields and at least one record size field.

5. A computer system for database record searching, wherein said computer system includes a main processor, a main memory, and a peripheral storage device having a secondary processor, said computer system comprising:

means for preparing a command block specifying a search string for record searching in at least one database table of said database;

means for issuing said command block from said main processor to said secondary processor within said peripheral storage device of said computer system;

means for utilizing said secondary processor within said peripheral storage device to read said at least one database table into a memory within said peripheral storage device, in response to a receipt of said command block;

means for comparing said search string in said command block to each record of said at least one database table within said memory of said peripheral storage device to identify all records which contain said search string; and means for moving all identified records which contain said search string from said memory of said peripheral storage device to said main memory within said computer system.

6. The computer system for database record searching according to claim 5, said computer system further includes means for returning of a search status block from said secondary processor to said main processor.

7. The computer system for database record searching according to claim 6, wherein said search status block further includes at least one search status field, at least three address pointer fields and at least one number of returned records field.

8. The computer system for database record searching according to claim 5, wherein said command block further includes at least four address pointer fields and at least one record size field.

9. The computer system for database record searching according to claim 5, wherein said peripheral storage device is a SCSI adaptor.

10. The computer system for database record searching according to claim 5, wherein said peripheral storage device is a SCSI disk controller.

11. The computer system for database record searching according to claim 5, wherein said peripheral storage device is a SCSI disk drive.

* * * * *